March 7, 1939.   H. SINCLAIR   2,149,369
POWER TRANSMISSION SYSTEM EMBODYING HYDRAULIC COUPLINGS
Filed March 18, 1937   2 Sheets-Sheet 1

Patented Mar. 7, 1939

2,149,369

UNITED STATES PATENT OFFICE 2,149,369

POWER TRANSMISSION SYSTEM EMBODYING HYDRAULIC COUPLINGS

Harold Sinclair, London, England

Application March 18, 1937, Serial No. 131,584
In Great Britain March 24, 1936

16 Claims. (Cl. 60—54)

The present invention relates to power transmission systems embodying a hydraulic coupling of the kinetic (Föttinger) type.

It is often desired to vary the torque transmission capacity of such a system, and for this purpose it is known to provide a torque-reducing control member. In one known arrangement this has the form of a hydraulic control member, such for example as a slidable ring valve, which can be operated to vary the circulation of the working liquid within the hydraulic coupling or a filling or emptying valve which can be operated to vary the liquid content of the working circuit and thereby alter the torque transmission capacity of the coupling itself. In another known arrangement the torque-reducing control member has the form of a brake operable for arresting or restraining the rotation of the driven part of the hydraulic coupling, such a brake being adapted to vary the torque transmission capacity of the system as a whole, since its effect is to intercept a part of the torque between the driving and the driven shafts.

The term "torque-reducing control member" is hereinafter employed to denote either a ring valve or equivalent device for throttling the circulation of liquid within the coupling, or means operable for varying the filling of the working circuit of the coupling, or a brake associated with the driving or the driven part of the coupling.

An object of the present invention in certain embodiments thereof is to provide an improved arrangement for operating such torque-reducing control members.

Hydraulic couplings may be used in power transmission systems of the kind in which, under certain circumstances, the element that is normally the driven machine temporarily returns power to the driving machine which is thus liable to be run at an excessive speed and damaged. For example, a ship's steering gear may comprise a steam turbine coupled to a hydraulic pump which drives a reversible hydraulic motor operatively connected with the helm. With such an arrangement, under certain conditions, the direction of the torque acting between the turbine and the hydraulic pump is reversed and the turbine is driven at a dangerously high speed. Another example of a system in which reversal of torque can take place, with risk of injury to the driving machine, is a Ward-Leonard winding-engine driven by a steam turbine or a Diesel engine through a hydraulic coupling.

A further object of the present invention in certain other embodiments thereof is to provide means which obviate risk of damage to the driving machine of a power transmission system of this kind, when an overrunning torque is applied to the system.

The present invention, in its broad aspect consists in providing a hydraulic coupling of the kinetic type with a torque-reducing control member (as hereinbefore defined) and with a differential mechanism which is so arranged that it is not required to transmit any substantial forward driving torque from the driving shaft to the driven shaft of the coupling and which, by employing part of the power applied to the hydraulic coupling, serves to operate, either at will or automatically, the torque-reducing control member.

By the term "differential mechanism" is meant a mechanism connecting together at least three cooperating elements which are movable, by either rotation or translation, relatively to one another, the arrangement being such that the ratio of the speeds of any two of said elements is fixed by constraining the remaining element or all the remaining elements to move at uniform speeds.

Thus where the invention is applied to the servo-control of a ring valve (or equivalent control member) in a hydraulic coupling, the differential mechanism connects together firstly the ring valve, secondly one of the rotatable vaned elements of the hydraulic coupling, and thirdly a brake drum which can be restrained at will.

Alternatively, where the invention is applied to the reduction of over-running torque in a power transmission system embodying a hydraulic coupling, the differential mechanism is adapted to connect together firstly the driving part of the hydraulic coupling, secondly the driven part of the hydraulic coupling, and thirdly the torque-reducing control member, the differential mechanism being responsive to reversal of slip in the hydraulic coupling and serving, upon reversal of torque-load in the system, to actuate the torque-reducing control member so as to reduce the over-running torque transmitted to the driving machine.

The invention will be further described with reference to the examples shown in the accompanying diagrammatic drawings, in which:

Fig. 1 shows an arrangement providing for servo operation of the ring valve of a hydraulic coupling. This arrangement also embodies a subsidiary feature, namely, means for imparting a slow backward rotation of the driven shaft of the coupling for a purpose to be hereinafter described.

Figure 1:
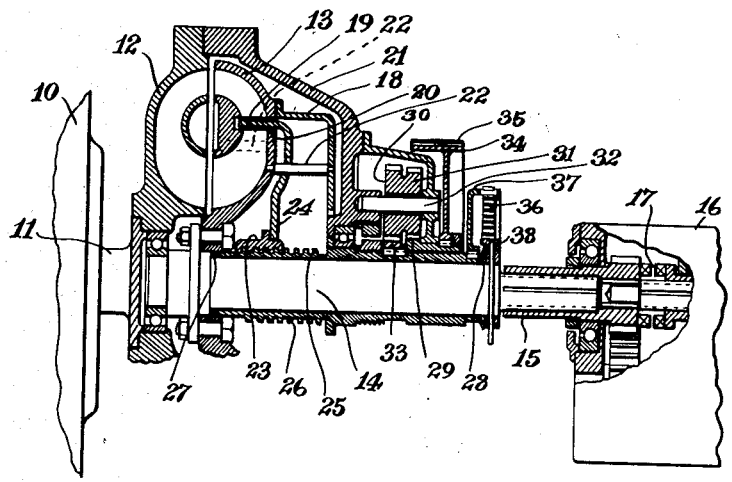
Fig. 1 is a sectional side elevation of part of the power transmission system of a vehicle.

In Fig. 1 the impeller 12 of the hydraulic coupling is fixed directly to the shaft 11 of an internal-combustion engine 10, while the runner 13 is fixed to a driven shaft 14. The impeller and runner each consist of an annular dished shell provided with radiating vanes, and these shells are juxtaposed to form a working circuit in the form of a toroidal ring. The driven shaft 14 is splined to the input shaft 15 of a mechanical change-speed gearing 16 having jaw clutches, such as 17, for selecting the various speeds. On the back of the runner shell is fixed a dished drum 18 which normally accommodates a ring valve 19 slidable into the circuit through an annular slot 20 in the runner shell. A dished casing 21 is secured to the periphery of the impeller and houses this drum.

This arrangement comprises a differential mechanism connecting together four elements, namely, the driving part and the driven part of the hydraulic coupling, the slidable ring valve, and a brake drum 34. Between the drum 18 and the runner 13 are fixed a plurality of cylindrical pins, such as 22, distributed around and parallel to the coupling axis. A nut 23 which has a left-hand thread is fixed to a disk 24 slidably mounted on the pins 22 so as to rotate with the runner and forming part of the ring valve 19. A sleeve 25 surrounds the driven shaft 14 and is threaded externally at 26 where it engages with the nut 23. Thrust washers 27 and 28 prevent the sleeve 25 from moving axially and it is rotatable relatively to the runner. On the sleeve 25 is fixed a small sun wheel 29 in constant mesh with the larger of a pair of planet wheels 30 and 31 integral with one another and journalled on a pin 32 fixed to the shell 21. The smaller planet wheel 31 meshes with a larger sun wheel 33 which is fixed to the brake drum 34 adapted to be held stationary by a brake shoe 35 (actuated by control means not shown).

A spiral spring 36 connects a drum 37, keyed to the sleeve 25, with a hub 38, pinned to the shaft 14.

When the engine shaft 11 is rotating clockwise (as viewed from the impeller end of the device) and the drum 34 is braked, the planet wheel 31 rolls round the fixed sun wheel 33 and the planet wheel 30 imparts a slow backward rotation to the sun wheel 29 and the sleeve 25. This sleeve therefore screws the nut 23 towards the impeller 12, causing the ring valve 19 to be inserted into the circuit; at the same time the relative rotation of the sleeve 25 and the runner tensions the spring 36. If the runner is stationary, the movement of the ring valve is relatively slow; if the runner is rotating forwards, the movement of the ring valve is faster. When the ring valve is fully closed, the brake drum 34 may slip under the shoe 35. Where, however, it is required to disengage a gear of the change-speed gearing 16 when the engine shaft 11 is running and the vehicle is stationary, the drag torque existing on the gearing may be relieved by maintaining the brake firmly applied after the ring valve is fully closed. As a result the nut 23, having reached the limit of its travel towards the left, is caused to rotate slowly in the reverse direction and thus to impart a similar rotation to the runner, with the result that the mechanical change-speed gearing is relieved of torque load. When the brake shoe 35 is disengaged, the spring 36 acts to return the ring valve to its inoperative position.

Where it is unnecessary to relieve drag torque on gearing associated with the hydraulic coupling, the brake can be arranged to act on the drum 37, the planetary gearing 29, 30, 31, 33 and the brake drum 34 being superfluous. Restraint by the brake of the drum 37 while the driven shaft is rotating closes the ring valve, the operative elements of the differential mechanism under these circumstances being the differential screw-and-nut mechanism.

Where a relatively rapid reversal of torque is apt to occur, as in the kind of ship's steering gear hereinbefore referred to, the invention may be carried into effect by providing, between the steam turbine and the hydraulic pump, a hydraulic coupling having a ring valve of known type, or like element which is movable into the working circuit of the coupling to throttle the circulation of liquid therein and thus to reduce the torque transmission capacity of the coupling, this ring valve being in the inoperative position when power is being transmitted from the turbine, and adapted to move into its operative position when the direction of torque is reversed and the speed of the driven coupling part consequently exceeds that of the driving coupling part.

The means for actuating the ring valve, or other device for preventing excessive overrunning torque from reaching the driving machine, may comprise two co-operating screw-threaded elements mounted co-axially with the coupling parts, one of these screw-threaded elements being slidable longitudinally of the coupling, and operatively connected with the torque-limiting means, while the other screw-threaded element is restrained from moving longitudinally relatively to the coupling, a slipable driving connection being provided between one or the other of the screw-threaded elements and the driving (or the driven) part of the coupling, while the remaining screw-threaded element is coupled for rotation with the driven (or the driving) part of the coupling, whereby these screw-threaded elements are constrained to rotate relatively to one another upon reversal of slip in the coupling.

Figure 2:
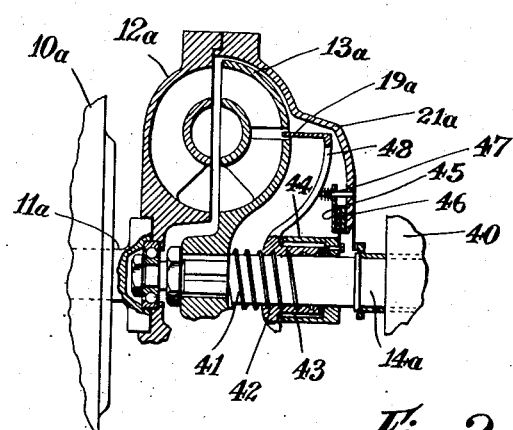
Figs. 2 and 3 are respectively sectional side elevations of parts of two hydraulic couplings adapted to limit overrunning torque.

Thus in the arrangement shown in Fig. 2, a driving machine 10a, having a shaft 11a, is coupled to a driven machine 40, having a shaft 14a, by a hydraulic coupling having a vaned impeller 12a fixed to the shaft 11a and a vaned runner 13a fixed to the driven shaft 14a which is provided with a right-handed screw-threaded portion 41. Co-operating with the screw 41 is a nut 42 operatively connected by a spider 48 with a ring valve 19a which is normally housed in the space between the runner and a dished casing 21a fixed to the impeller. The nut is provided with splines 43 with which engages an internally splined boss 44. To this boss is fixed a friction ring 46 which is lightly pressed by a pressure plate 45, loaded by springs, such as 47, against the casing 21a.

When the shaft 11a is rotating in the clockwise direction, as viewed from the left of Fig. 2, and the slip is in the normal direction, the ring valve 19a is held in its inoperative position, as shown, the friction clutch 45, 46 slipping and the nut 42 rotating with the driven part. When the driven machine begins to return power to the driving machine, the slip reverses, and the friction clutch momentarily stops slipping and rotates the nut 42 relatively to the driven shaft so that the ring valve is moved into its operative position, obstructs the flow of the working liquid, and thus reduces the overrunning torque transmitted. If the driven machine continues to overrun, the friction clutch begins to slip as soon as the ring valve has entirely closed the circuit. When the slip is restored to its normal direction, the clutch again momentarily stops slipping and moves the ring valve into its inoperative position.

Figure 3:
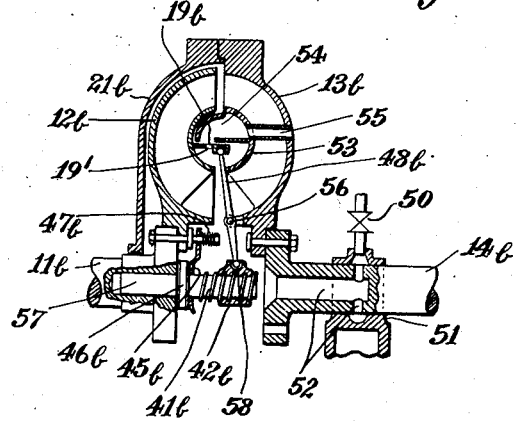

The coupling shown in Fig. 3 is of the kind in which the liquid content can be varied during operation. In this example the impeller 12b, which is fixed to the driving shaft 11b, is enclosed by a casing 21b fixed to the runner 13b. Liquid can be admitted to the coupling from a pressure supply through a valve 50, a manifold 51 embracing the driven shaft 14b, and ducts 52 in this shaft. The coupling is of the known core-tube emptying type having the core guide member 53 that rotates with the runner shaped to form an annular channel 54 opening towards the coupling axis, this channel being provided with a plurality of drain tubes, one of which is shown at 55. The mouth of the channel 54 can be opened and closed by a ring valve 19b actuated by a plurality of radial levers, such as 48b, pivoted to the runner at 56 so as to rotate therewith. A shaft 57, journalled in a counter-bore in the driving shaft, is provided with a friction disk 46b and a screw-thread 41b. The friction disk is pressed against the end of the shaft 11b by a pressure ring 45b lightly loaded by springs 47b and carried by the impeller. A nut 42b is engaged with the screw 41b and is constrained to rotate with the runner 13b, since the radially inner ends of the levers 48b are engaged in radial holes 58 in the nut. The ring valve 19b may be provided with a restricted leakage port 19' so as to ensure a continuous slow discharge of liquid from the coupling when the ring valve is shut, the liquid content being adjusted by means of the valve 50.

During normal operation of the coupling, the clutch 45b, 46b slips, the parts being in the configuration shown. Liquid enters the core space in a radially outward direction, but is prevented from freely entering the channel 54 by the valve 19b. When the slip reverses, the friction clutch momentarily stops slipping, causing the nut 42b to move towards the driving shaft, so that the ring valve 19b is opened; the working liquid thereupon rapidly escapes from the working circuit through the tubes 55, and the torque transmission capacity of the coupling falls.

Figure 4:
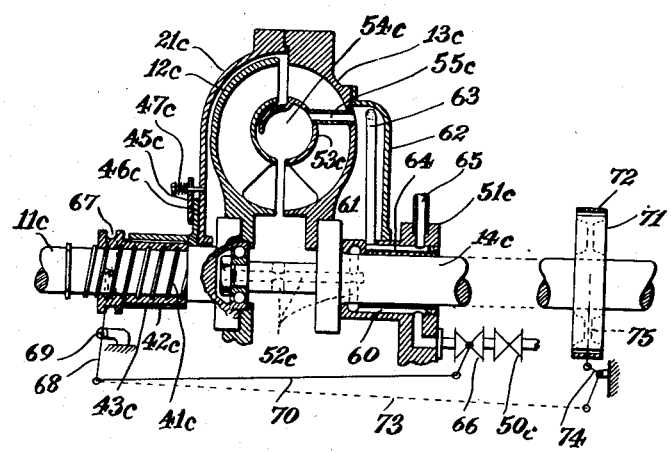
Fig. 4 is a diagram of a power transmission system adapted to limit overrunning torque.

In the arrangement shown in Fig. 4, the slip-responsive means are disposed outside the hydraulic coupling, which is provided with means of known type for varying the liquid content during operation. The impeller 12c, which is fixed to the driving shaft 11c, is enclosed by a casing 21c fixed to the runner 13c. Liquid can be admitted to the coupling from a pressure supply through valves 50c and 66, a duct 60 in a manifold 51c embracing the driven shaft 14c, and ducts 52c in this shaft. The core guide member 53c on the runner is shaped to form an annular channel 54c opening towards the coupling axis and communicating by a plurality of tubes, such as 55c, with an annular chamber 61 enclosed by a cover 62 fixed to the back of the runner. A scoop-ended tube 63 fixed to the manifold 51c projects radially within this chamber and communicates, by a duct 64, with an outlet pipe 65. While the coupling is running normally liquid is continuously discharged by the tubes 55c to the chamber 61 where it is scooped up by the stationary tube 63 and thus exhausted, the liquid content being regulated by the rate of admission through the valve 50c. A screw thread 41c formed on the driving shaft co-operates with a nut 42c having external splines 43c engaged with internal splines on a boss 44c, a flanged end 46c of which is pressed against the casing 21c by a pressure plate 45c lightly loaded by springs 47c. The nut 42c is provided with a circumferential groove 67 in which engages a forked lever 68 pivoted at 69 to a fixed point, and coupled by a link 70 to the valve 66.

When the slip in the hydraulic coupling is in the normal direction, the parts are in the configuration shown, the valve 66 being open. When overrunning torque is applied to the system, the clutch 45c, 47c momentarily stops slipping and causes the nut 42c to move away from the coupling and thus close the valve 66. In consequence, liquid is unable to flow into the coupling, so that the liquid content diminishes.

Fig. 4 shows also a construction where the slip-responsive means serve to limit the amount of overrunning torque transmitted to the driving shaft by absorbing some of this torque in a brake. In the example shown the brake is on the driven shaft and consists of a drum 71 cooperating with a band 72 adapted to be contracted on to the drum by a link 75 connected by a bell-crank lever 74 to a push-rod 73 pivoted to the lever 68, the arrangement being such that, when the slip reverses under overrunning torque the brake is applied. The brake may be fitted to any other part of the transmission system, for example to the driving machine.

I claim:

1. A power transmission system comprising a hydraulic coupling of the kinetic type having a rotatable vaned driving part and a rotatable vaned driven part, said parts co-operating to form a working circuit, control means movable within said circuit for throttling the circulation therein, and differential mechanism connecting together at least said control means, said driving part, and said driven part and serving to actuate said control means by the agency of part of the power applied to said coupling.

2. A power transmission system comprising a hydraulic coupling of the kinetic type having two cooperating rotatable vaned parts, a torque-reducing control member, a brakeable member and differential mechanism connecting together said two vaned parts, said torque-reducing control member, and said brakeable member, and means operable to restrain rotation of said brakeable member and thereby cause servo operation of said control member.

3. A power transmission system comprising a hydraulic coupling of the kinetic type having a rotatable vaned driving part and a rotatable vaned driven part, said parts co-operating to form a working circuit, control means movable within said circuit for throttling the circulation therein, a brakeable member, and differential mechanism connecting together said driving part, said driven part, said control means, and said brakeable member, and means operable to restrain said brakeable member and thereby cause servo operation of said control means.

4. A power transmission system comprising a hydraulic coupling of the kinetic type having a rotatable vaned driving part and a rotatable vaned driven part, said parts co-operating to form a working circuit, control means movable within said circuit for throttling the circulation therein, a rotatable brakeable member, differential mechanism connecting together said vaned driving part, said vaned driven part, said control means and said brakeable member, means operable to restrain rotation of said brakeable member, and an elastic coupling device connecting together two of said differentially connected parts, the ratios of said differential mechanism being such that, when said vaned driving part is rotating faster than said vaned driven part and said brakeable member is arrested, said control means are operated to throttle said circuit, and said elastic coupling device serving to return said control means when said brakeable member is released.

5. A power transmission system comprising a hydraulic coupling of the kinetic type having a rotatable vaned driving part and a rotatable vaned driven part, said parts co-operating to form a working circuit, a ring valve movable into said circuit, a screw-threaded member which is movable axially of said coupling, which is operatively connected with said ring valve, and which is constrained to rotate with said vaned driven part, a second screw-threaded member, which is engaged with said first-mentioned screw-threaded member, a brakeable member, a planetary gear having three co-operating elements rotatable relatively to one another and connected respectively to said second-mentioned screw-threaded member, to said vaned driving part, and to said brakeable member, means operable to restrain rotation of said brakeable member to cause said ring valve to move into said circuit when said driving part is rotating faster than said driven part, and means for moving said ring valve out of said circuit.

6. A power transmission system comprising a hydraulic power transmitter of the kinetic type having a rotatable vaned driving part, a rotatable vaned driven part, a sun wheel connected for rotation with said driven part, a second sun wheel, of only slightly larger diameter than said first-mentioned sun wheel, two co-axial planet wheels constrained to rotate together and meshing respectively with said sun wheels, a carrier on which said planet wheels are journalled and which is connected to said driving part, and control means operable for restraining the rotation of said second sun wheel to cause said driven part to rotate slowly oppositely to said driving part.

7. A hydraulic coupling of the kinetic type comprising a rotatable vaned driving part, a rotatable vaned driven part, said parts co-operating to form a working circuit for coupling liquid, a ring valve operable for throttling said circuit, a brake drum, means operable for restraining rotation of said drum, and differential mechanism which connects said driving part, said driven part, said ring valve and said brake drum and which, when said brake drum is restrained, employs energy derived from said driving part to close said ring valve and thereafter to rotate said driven part oppositely to its normal direction of rotation.

8. A power transmission system comprising a driving machine, a driven machine, a hydraulic coupling of the kinetic type connecting said machines together, a torque-reducing control member, differential mechanism connecting together said driving machine, said driven machine and said control member, said differential mechanism serving automatically, on reversal of slip in said coupling, to actuate said control member so as to reduce the overrunning torque on at least said driving machine.

9. A hydraulic coupling of the kinetic type having a rotatable vaned driving part, a rotatable vaned driven part, said parts co-operating to form a circuit for working liquid, a control member operable for throttling the circulation of liquid in said circuit, and mechanical differential mechanism responsive to reversal of slip in said coupling for actuating said control member.

10. A power transmission system comprising a driving machine, a driven machine, a hydraulic coupling of the kinetic type having a vaned driving part coupled to said driving machine and a vaned driven part coupled to said driven machine, a torque-reducing control member, two co-operating screw-threaded elements mounted co-axially with said coupling, one of said elements being slidable longitudinally of said coupling and operatively connected with said control member, while the other of said screw-threaded elements is restrained from moving longitudinally of said coupling, and a slipable driving connection between one of said screw-threaded elements and one of said vaned coupling parts, the other of said screw-threaded elements being coupled for rotation with the other of said vaned coupling parts, whereby said screw-threaded elements are constrained to rotate relatively to each other and actuate said control member upon reversal of slip in said hydraulic coupling.

11. A hydraulic coupling of the kinetic type having a rotatable vaned driving part, a rotatable vaned driven part, said parts co-operating to form a circuit for working liquid, a control member operable for varying the liquid content in said circuit, and mechanical differential mechanism responsive to reversal of slip in said coupling for actuating said control member.

12. A power transmission system comprising a driving machine, a driven machine, a hydraulic slip coupling connecting said machines together, a control member operable for braking one of said machines, and mechanical differential mechanism connecting together said driving and driven machines and said control member, and responsive to reversal of the direction of slip in said coupling for actuating said control member.

13. A hydraulic coupling of the kinetic type having a vaned driving part, a vaned driven part, said parts co-operating to form a working circuit for coupling liquid, a control member operable for throttling the circulation of liquid in said circuit, two co-operating screw-threaded elements mounted co-axially with said coupling, one of said elements being slidable longitudinally of said coupling and operatively connected with said control member, while the other of said screw-threaded elements is restrained from moving longitudinally of said coupling, and a slipable driving connection between one of said screw-threaded elements and one of said vaned coupling parts, the other of said screw-threaded elements being coupled for rotation with the other of said vaned coupling parts, whereby said screw-threaded elements are constrained to rotate relatively to each other and actuate said control member upon reversal of slip in said hydraulic coupling.

14. A hydraulic coupling of the kinetic type having a vaned driving part, a vaned driven part, said parts co-operating to form a working circuit for coupling liquid, a control member operable for varying the liquid content of said circuit, two cooperating screw-threaded elements mounted co-axially with said coupling, one of said elements being slidable longitudinally of said coupling and operatively connected with said control member, while the other of said screw-threaded elements is restrained from moving longitudinally of said coupling, and a slipable driving connection between one of said screw-threaded elements and one of said vaned coupling parts, the other of said screw-threaded elements being coupled for rotation with the other of said vaned coupling parts, whereby said screw-threaded elements are constrained to rotate relatively to each other and actuate said control member upon reversal of slip in said hydraulic coupling.

15. A power transmission system comprising a driving machine, a driven machine, a hydraulic coupling of the kinetic type having a vaned driving part coupled to said driving machine and a vaned driven part coupled to said driven machine, a control member operable for braking one of said machines, two co-operating screw-threaded elements mounted co-axially with said coupling, one of said elements being slidable longitudinally of said coupling and operatively connected with said control member, while the other of said screw-threaded elements is restrained from moving longitudinally of said coupling, and a slipable driving connection between one of said screw-threaded elements and one of said vaned coupling parts, the other of said screw-threaded elements being coupled for rotation with the other of said vaned coupling parts, whereby said screw-threaded elements are constrained to rotate relatively to each other and actuate said control member upon reversal of slip in said hydraulic coupling.

16. A power transmission system comprising a hydraulic coupling of the kinetic type having an impeller member and a runner member, a hydraulic valve operable for varying the torque-transmission capacity of said coupling, differential screw mechanism which connects together said impeller member, said runner member and said valve, said differential mechanism being associated with a frictional connection which, when slip therein ceases, constrains said differential mechanism to actuate said valve through the agency of part of the power delivered to said coupling.

HAROLD SINCLAIR.